US008733610B2

(12) United States Patent
Pedicini

(10) Patent No.: US 8,733,610 B2
(45) Date of Patent: May 27, 2014

(54) FASTENER DRIVING APPARATUS

(71) Applicant: Christopher Pedicini, Nashville, TN (US)

(72) Inventor: Christopher Pedicini, Nashville, TN (US)

(73) Assignee: Tricord Solutions, Inc., Nashville, TN (US)

( * ) Notice: Subject to any disclaimer, the term of this patent is extended or adjusted under 35 U.S.C. 154(b) by 0 days.

(21) Appl. No.: 13/922,465

(22) Filed: Jun. 20, 2013

(65) Prior Publication Data

US 2014/0054350 A1 Feb. 27, 2014

Related U.S. Application Data

(63) Continuation of application No. 13/888,863, filed on May 7, 2013, now abandoned.

(60) Provisional application No. 61/691,746, filed on Aug. 21, 2012.

(51) Int. Cl.

| | |
|---|---|
| ***B21J 15/28*** | (2006.01) |
| ***B27F 7/17*** | (2006.01) |
| ***B25C 1/04*** | (2006.01) |
| ***B25C 5/02*** | (2006.01) |
| ***B25C 5/06*** | (2006.01) |
| ***B23Q 5/00*** | (2006.01) |
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |

(52) U.S. Cl.
USPC .................... 227/130; 227/8; 173/6; 173/201

(58) Field of Classification Search
CPC ......... B25D 17/06; B25D 11/125; B25C 1/04
USPC ............ 227/130–131, 2, 7–8; 173/1–11, 114, 173/117, 118, 201–204, 121, 212, 176, 132, 173/48, 104, 109, 217
See application file for complete search history.

(56) References Cited

U.S. PATENT DOCUMENTS

| | | | | |
|---|---|---|---|---|
| 3,791,149 | A * | 2/1974 | Strecker et al. | 60/543 |
| 4,932,479 | A | 6/1990 | Pyatov | |
| 6,499,643 | B1 | 12/2002 | Hewitt | |
| 6,755,336 | B2 | 6/2004 | Harper et al. | |
| 7,793,811 | B1 * | 9/2010 | Pedicini et al. | 227/2 |

(Continued)

*Primary Examiner* — Robert Long
(74) *Attorney, Agent, or Firm* — Jay Schloff; Keith Schonberger; Aidenbaum Schloff and Bloom PLLC

(57) ABSTRACT

A fastener driving apparatus includes a vacuum piston and a drive piston, which vacuum piston, when moved (by way of a motor and linear motion converter), draws a vacuum against the drive piston, which drive piston may be held in place by retention means. An anvil is coupled to the drive piston. The retention means is released electrically or mechanically at or near the point of maximum vacuum volume. This drive piston and anvil assembly is then driven by atmospheric pressure and may strike as fastener to drive it into a substrate. At least one position sensor may be used. Once the fastener is driven, the apparatus may reset to an initial position. At least one valve may be included to dump the energy stored in the vacuum in the case of a jam condition, thus providing good safety profile.

20 Claims, 7 Drawing Sheets

(56) References Cited

U.S. PATENT DOCUMENTS

| | | | | |
|---|---|---|---|---|
| 8,011,443 | B2 * | 9/2011 | Meixner et al. | 173/118 |
| 8,079,504 | B1 * | 12/2011 | Pedicini et al. | 227/2 |
| RE44,001 | E * | 2/2013 | Pedicini et al. | 227/2 |
| 8,393,409 | B2 * | 3/2013 | Pedicini | 173/201 |
| 8,523,035 | B2 * | 9/2013 | Pedicini et al. | 227/2 |
| 8,602,124 | B2 * | 12/2013 | Pedicini | 173/201 |
| 2008/0314608 | A1 * | 12/2008 | Berger et al. | 173/132 |
| 2010/0236802 | A1 * | 9/2010 | Berger et al. | 173/118 |
| 2012/0172939 | A1 * | 7/2012 | Pedicini | 606/86 R |
| 2012/0286014 | A1 * | 11/2012 | Pedicini et al. | 227/4 |

* cited by examiner

NOTES

PISTON=HALL, START = LIMIT SWITCH

MOTOR FWD & REVERSE VIA PWR FETS

BX24 = MICROPROCESSOR CONTROL

SCHEMATIC IS ILLUSTRATIVE ONLY

FASTENER DRIVING APPARATUS

CROSS-REFERENCE TO RELATED APPLICATIONS

The present application is a continuation of and claims priority under 35 U.S.C. §120 on the pending U.S. patent application Ser. No. 13/888,863, filed on May 7, 2013, the disclosure of which is incorporated by reference, which '863 application claims priority under 35 U.S.C. §119 on U.S. Provisional Patent Application 61/691,746, filed Aug. 21, 2012, the disclosure of which is incorporated by reference. Additionally, the present application claims priority under 35 U.S.C. §119 on pending U.S. Provisional Application Ser. No. 61/691,746, filed on Aug. 21, 2012, the disclosure of which is incorporated, by reference.

FIELD OF THE DISCLOSURE

The present disclosure relates to fastener driving apparatuses, and, more particularly, to such fastener or staple driving mechanisms that require operation as a hand tool.

BACKGROUND

An electromechanical fastener driving apparatus (also referred to herein as a "gun" or "device") weighs generally less than 15 pounds and is generally suitable for an entirely portable operation. Contractors and homeowners commonly use power-assisted means of driving fasteners into wood. These power-assisted means of driving fasteners can be either in the form of finishing fastener systems used in baseboards or crown molding in house and household projects, or in the form of common fastener systems that are used to make walls or hang sheathing onto same. These systems can be portable (i.e., not connected or tethered to an air compressor or wall outlet) or non-portable.

The most common fastener driving apparatus uses a source of compressed air to actuate a cylinder to push a fastener into a substrate. For applications in which portability is not required, this is a very functional system and allows rapid delivery of fasteners for quick assembly. A disadvantage is that it does however require that the user purchase an air compressor and associated air-lines in order to use this system. A further disadvantage is the inconvenience of the device being tethered (through an air hose) to an air compressor.

To solve this problem, several types of portable fastener drivers operate of of fuel cells. Typically, these guns have a cylinder in which a fuel is introduced along with oxygen from the air. The subsequent mixture is ignited with the resulting expansion of gases pushing the cylinder and thus driving the fastener into the workpieces. This design is complicated and is far more expensive then a standard pneumatic fastener gun. Both electricity and fuel are required as the spark source derives its energy typically from batteries. The chambering of an explosive mixture of fuel, the use of consumable fuel cartridges, the loud report and the release of combustion products are all disadvantages of this solution. Systems such as these are already in existence and are sold commercially to contractors under the Paslode™ name.

Another commercially available solution is fastener guns that use electrical energy to drive a stapler or wire brad. These units typically use a solenoid to drive the fastener (such as those commercially available under the Arrow™ name or those which use a ratcheting spring system such as the Ryobi™ electric stapler). These units are limited to short fasteners (typically 1" or less), are subject to high reactionary forces on the user and are limited in their repetition rate. The high reactionary force is a consequence of the comparatively long time it takes to drive the fastener into the substrate. Additionally, because of the use of mechanical springs or solenoids, the ability to drive longer fasteners or larger fasteners is severely restricted, thus relegating these devices to a limited range of applications. A further disadvantage of the solenoid driven units is they often must be plugged into the wall in order to have enough voltage to create the force needed to drive even short fasteners.

A final commercially available solution is to use a flywheel mechanism and either clutch the flywheel to an anvil that drives the fastener. Examples of such tools can be found under the Dewalt™ name. This tool is capable of driving the fasteners very quickly and in the longer sizes. The primary drawback to such a tool is the large weight and size as compared to the pneumatic counterpart. Additionally, the drive mechanism is very complicated, which gives a high retail cost in comparison to the pneumatic fastener gun.

Clearly based on the above efforts, a need exists to provide portable solution to driving fasteners which is unencumbered by fuel cells or air hoses. Additionally, the solution ought to provide a low reactionary feel, drive full size fasteners and be simple, cost effective and robust in operation.

The prior art teaches several additional ways of driving a fastener or staple. The first technique is based on a multiple impact design. In this design, a motor or other power source is connected to the impact anvil through either a lost motion or other device. This allows the power source to make multiple impacts on the fastener to drive it into the workpiece. The disadvantages in this design include increased operator fatigue since the actuation technique is a series of blows rather than a single drive motion. A further disadvantage is that this technique requires the use of an energy absorbing mechanism once the fastener is seated. This is needed to prevent the anvil from causing excessive damage to the substrate as it seats the fastener. Additionally, the multiple impact designs are not very efficient because of the constant motion reversal and the limited operator production speed.

A second design that is taught in U.S. Pat. Nos. 3,589,588, 5,503,319, and 3,172,121 includes the use of potential energy storage mechanisms (in the form of a mechanical spring). In these designs, the spring is cocked (or activated) through an electric motor. Once the spring is sufficiently compressed, the energy is released from the spring into the anvil (or fastener driving piece), thus pushing the fastener into the substrate. Several drawbacks exist to this design. These include the need for a complex system of compressing and controlling the spring, and in order to store sufficient energy, the spring must be very heavy and bulky. Additionally, the spring suffers from fatigue, which gives the tool a very short life. Finally, metal springs must move a significant amount of mass in order to decompress, and the result is that these low-speed fastener drivers result in a high reactionary force on the user.

To improve upon this design, an air spring has been used to replace the mechanical spring. U.S. Pat. No. 4,215,808 teaches of compressing air within a cylinder and then releasing the compressed air by use of a gear drive. This patent overcomes some of the problems associated with the mechanical spring driven fasteners described above, but is subject to other limitations. One particular troublesome issue with this design is the safety hazard in the event that the anvil jams on the downward stroke. If the fastener jams or buckles within the feeder and the operator tries to clear the jam, he is subject to the full force of the anvil, since the anvil is predisposed to the down position in all of these types of devices. A further disadvantage presented is that the fastener must be led once the anvil clears the fastener on the backward stroke. The amount of time to feed the fastener is limited and can result in jams and poor operation, especially with longer fasteners. A further disadvantage to the air spring results from the need to have the ratcheting mechanism as part of the anvil drive. This mechanism adds weight and causes significant problems in controlling the fastener drive since the weight must be stopped at the end of the stroke. This added mass slows the fastener drive stroke and increases the reactionary force on the operator. Additionally, because significant kinetic energy is contained within the air spring and piston assembly the unit suffers from poor efficiency. This design is further subject to a complicated drive system for coupling and uncoupling the air spring and ratchet from the drive train which increases the production cost and reduces the system reliability.

U.S. Pat. No. 5,720,423 again teaches of an air spring that is compressed and then released to drive the fastener. The drive or compression mechanism used in this device is limited in stroke and thus is limited in the amount of energy which can be stored into the air stream. In order to provide sufficient energy in the air stream to achieve good performance, this patent teaches use of a gas supply which preloads the cylinder at a pressure higher than atmospheric pressure. Furthermore, the compression mechanism is bulky and complicated, in addition, the timing of the motor is complicated by the small amount of time between the release of the piston and anvil assembly from the drive mechanism and its subsequent re-engagement. Additionally, U.S. Pat. No. 5,720,423 teaches that the anvil begins in the retracted position, which further complicates and increases the sin of the drive mechanism. Furthermore, because of the method of activation, these types of mechanisms as described in U.S. Pat. Nos. 5,720,423 and 4,215,808 must compress the air to full energy and then release off the tip of the gear while under full load. This method of compression and release causes severe mechanism wear.

A third means for driving a fastener that is taught includes the use of flywheels as energy storage means. The flywheels are used to launch a hammering anvil that impacts the fastener. This design is described in detail in U.S. Pat. Nos. 4,042,036, 5,511,715, and 5,320,270. One major drawback to this design is the problem of coupling the flywheel to the driving anvil. This prior art teaches the use of a friction clutching mechanism that is both complicated, heavy and subject to wear. Further limiting this approach is the difficulty in controlling the energy in the fastener system. The mechanism requires enough energy to drive the fastener, but retains significant energy in the flywheel after the drive is complete. This further increases the design complexity and size of such prior art devices.

A fourth means for driving a fastener is taught in the inventor's U.S. Pat. No. 8,079,504, which uses a compression on demand system with a magnetic detent. This system overcomes many of the advantages of the previous systems but still has its own set of disadvantages which include the need to retain a very high pressure for a short period of time. This pressure and subsequent force necessitate the use of high strength components and more expensive batteries and motors.

All of the currently available devices suffer from one or more the following disadvantages:

Complex and expensive and unreliable designs. Fuel powered mechanisms such as Paslode™ achieve portability but require consumable fuels and are expensive. Rotating flywheel designs such as Dewalt™ have complicated, coupling or clutching mechanisms based on frictional means. This adds to their expense.

Poor ergonomics. The fuel powered mechanisms have loud combustion reports and combustion fumes. The multiple impact devices are fatiguing and are noisy.

Non-portability. Traditional fastener guns are tethered to a fixed compressor and thus must maintain a separate supply line.

High Reaction force and short life. Mechanical spring driven mechanisms have high tool reaction forces because of their long fastener drive times. Additionally, the springs are not rated for these types of duty cycles leading to premature failure. Furthermore consumers are unhappy with their inability seat longer fasteners or work with denser wood species.

Safety issues. The "air spring" and heavy spring driven designs suffer from safety issues for longer fasteners since the predisposition of the anvil is towards the substrate. During jamb clearing, this can cause the anvil to strike the operators hand.

The return mechanisms in most of these devices involve taking some of the drive energy. Either there is a bungee or spring return of the driving anvil assembly or there is a vacuum or air pressure spring formed during the movement of the anvil. All of these mechanisms take energy away from the drive stroke and decrease efficiency.

In light of these various disadvantages, there exists the need for a fastener driving apparatus that overcomes these various disadvantages of the prior art, while still retaining the benefits of the prior art.

SUMMARY OF THE INVENTION

In accordance with the present invention, a fastener driving apparatus is described which derives its power from an electrical source, preferably rechargeable batteries, and uses a motor to transfer energy through a single stroke linear vacuum generator that creates a vacuum in a single linear stroke. The vacuum acts on a drive piston, which piston is detained by a retention device until a sufficient volume of vacuum is created. An anvil is connected to the drive piston. Once the vacuum created is sufficient for driving the fastener, the retention mechanism can release, allowing the driving piston and anvil to drive the fastener. The vacuum generator (or vacuum piston) is then preferably returned to its start position and the drive piston is likewise returned to its starting position. By using a vacuum rather than pressure, the inventor unexpectedly increased the efficiency of the electro-pneumatic system by more than 50% as measured by energy consumed per fastener driven.

The fastener driving cycle may start with an electrical signal, after which a circuit connects a motor to the electrical power source. The motor is coupled to the linear motion converter, preferably through a speed reduction mechanism. In an embodiment, the speed reduction mechanism is a planetary gearbox. The linear motion converter changes the rotational motion of the motor into linear translating movement of the vacuum piston inside a cylinder. The movement of this vacuum piston begins to create a vacuum in the cylinder or in a chamber (such as a chamber formed by a face of the vacuum piston and either the closed end of a cylinder, or preferably a face of the driving piston). It will be apparent that the vacuum as it is generated is at a pressure significantly less than atmospheric and is achieved during at least one point in the operational cycle. Upon creation of a sufficient vacuum volume the drive piston may released from its retention means. (It will be apparent that the drive piston may be released front the retention means through means other than the vacuum, such as by deactivating an electromagnet that is the retention means.)

The vacuum on the face of the drive piston pulls the drive piston, which drive piston thereafter drives a fastener. The exemplary cycle completes with the vacuum piston substantially returning to its previous position. The drive piston may be predisposed to its initial position via contact with the vacuum piston. By returning the drive piston in this fashion, virtually all of the energy from the single stroke linear vacuum is available to drive the fastener. Additionally, in the event of a jam, the movement of the vacuum piston resets the drive piston and anvil allowing for easy clearing of the jam. Bumpers may be provided to absorb excess energy at the ends of the strokes of the pistons, for example. Control of the system is possible through a very simple circuit which applies and removes power to the motor to complete a cycle.

In an embodiment, the vacuum piston and the drive piston share a common cylinder, which configuration simplifies the design as only a single cylinder is needed. Additionally, the movement of the vacuum piston can push the driving piston and anvil back into an initial position.

In an embodiment, the retention means is magnetic and preferably a combination of magnets and electromagnets. The drive piston is preferably released from the retention force exerted by the electromagnet as the vacuum piston is at or near the point of maximum vacuum volume thus allowing the drive piston and anvil to drive the fastener.

In an embodiment, leaks, valves or small holes are incorporated into the cylinder and/or the vacuum piston such that. If the drive piston stalls on the downward stroke, the vacuum is released and the safety of the device is improved during jam clearing.

In an embodiment, a bumper is disposed between the drive piston and the vacuum piston such that excess energy is absorbed in the bumper, thereby reducing the potential for damaging impacts between the two pistons.

In an embodiment, a sensor and a control circuit are provided for determining at least one position of the vacuum piston and thus enable the proper timing for stopping the cycle and or releasing an electrically activated detent.

In an embodiment, a mechanical element is used such that as the vacuum piston approaches the point of maximum vacuum volume, the mechanical element releases the drive piston from the retention means.

In an embodiment, a check valve may be disposed in at least one of the vacuum piston, the drive piston, or the cylinder to prevent buildup of air in the cylinder or vacuum chamber during use. In a further embodiment, the check valve may be disposed in or coupled with one or more seals, for example, which one or more seal may be disposed on the vacuum piston, for example. A U-cup seal that holds air pressure in a single direction would be an example of such a seal.

In another embodiment, a valve may regulate the flow rate of air into the area behind the drive piston and be used to control the drive energy.

In another embodiment, the linear motion converter comprises a rack and pinion arrangement, which presents a more constant torque load to the motor during the creation of the vacuum volume.

In an embodiment an overload or slip clutch may be used to protect the motor and linear motion conversion mechanism.

Accordingly, and in addition to the objects and advantages of the portable electric fastener gun as described above, several objects and advantages of the present invention are:

To provide a simple design for driving fasteners that has a significantly lower production cost than currently available nail guns and that is portable and does not require an air compressor.

To provide a fastener driving device that mimics the pneumatic fastener performance without a tethered air compressor.

To provide an electrical driven high power fastening device that has very little wear.

To provide an electric motor driven fastener driving device in which energy is not stored behind the fastener driving anvil, thus greatly enhancing tool safety.

To provide a simple apparatus for driving a fastener in which sufficient energy to drive the fastener is created in a single stroke, thus greatly increasing the system efficiency.

To eliminate bungee, vacuum or mechanical spring returns on the drive piston and/or anvil thus increasing energy available to drive the fastener and speed at which the drive takes place.

To provide a more energy efficient mechanism for driving nails than is presently achievable with a compressed air design.

These together with other aspects of the present disclosure, along with the various features of novelty that characterize the present disclosure, are pointed out with particularity in the claims annexed hereto and form a part of the present disclosure. For a better understanding of the present disclosure, its operating advantages, and the specific objects attained by its uses, reference should be made to the accompanying drawings and detailed description in which there are illustrated and described exemplary embodiments of the present disclosure.

DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

Figure 1:
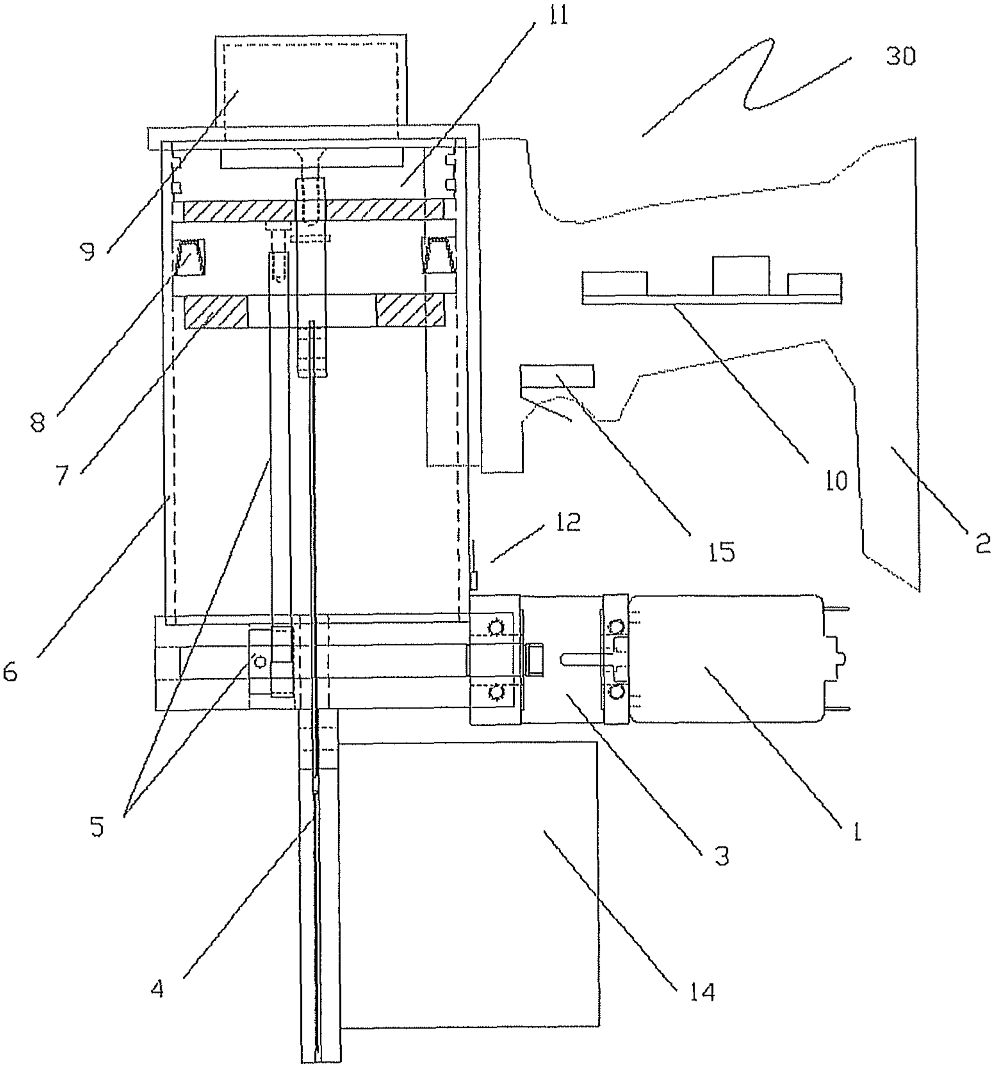
FIG. 1 shows a cutaway view of a fastener driving apparatus, in accordance with an exemplary embodiment of the present disclosure.
Figure 2:
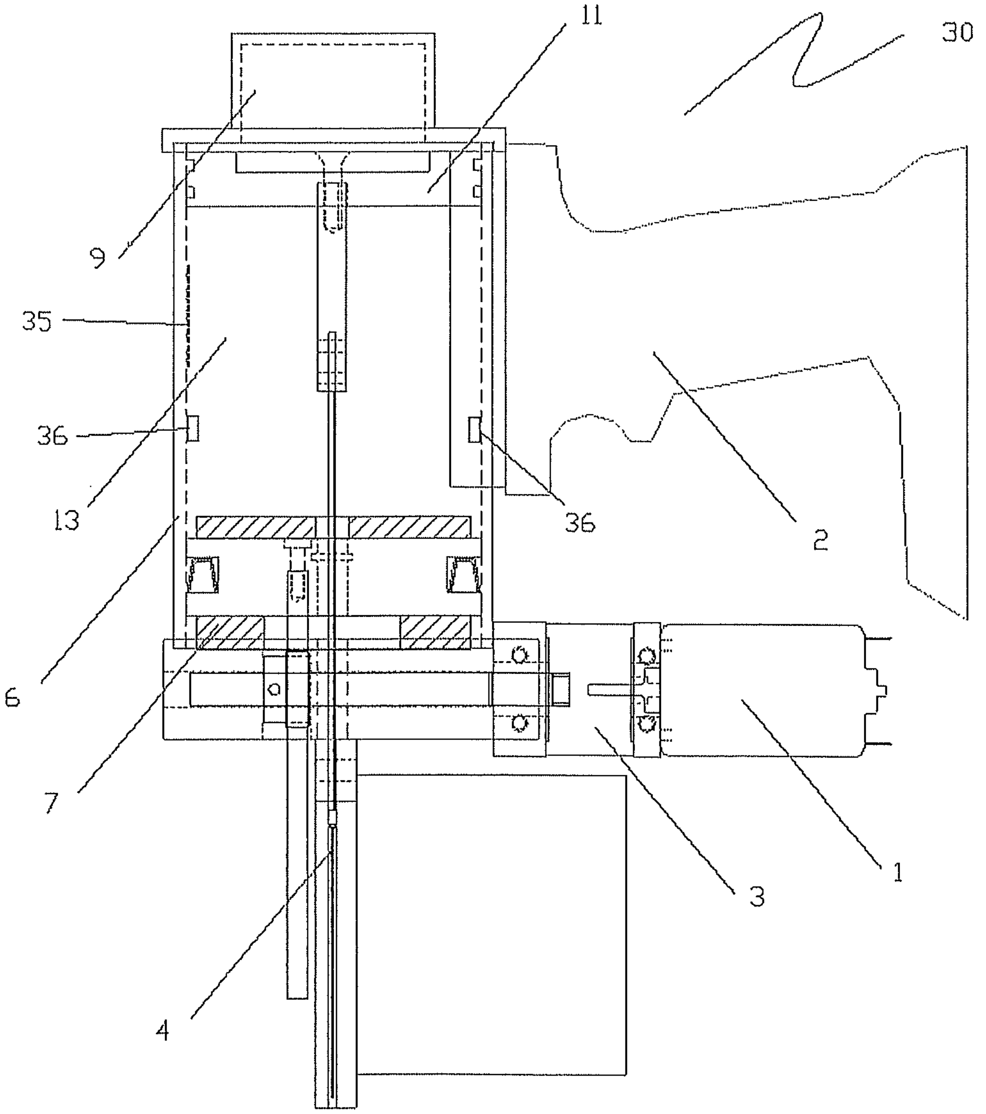
FIG. 2 shows a cutaway view of a fastener driving apparatus showing the vacuum piston in a down position with the vacuum chamber being created in accordance with an exemplary embodiment of the present disclosure.
Figure 3:
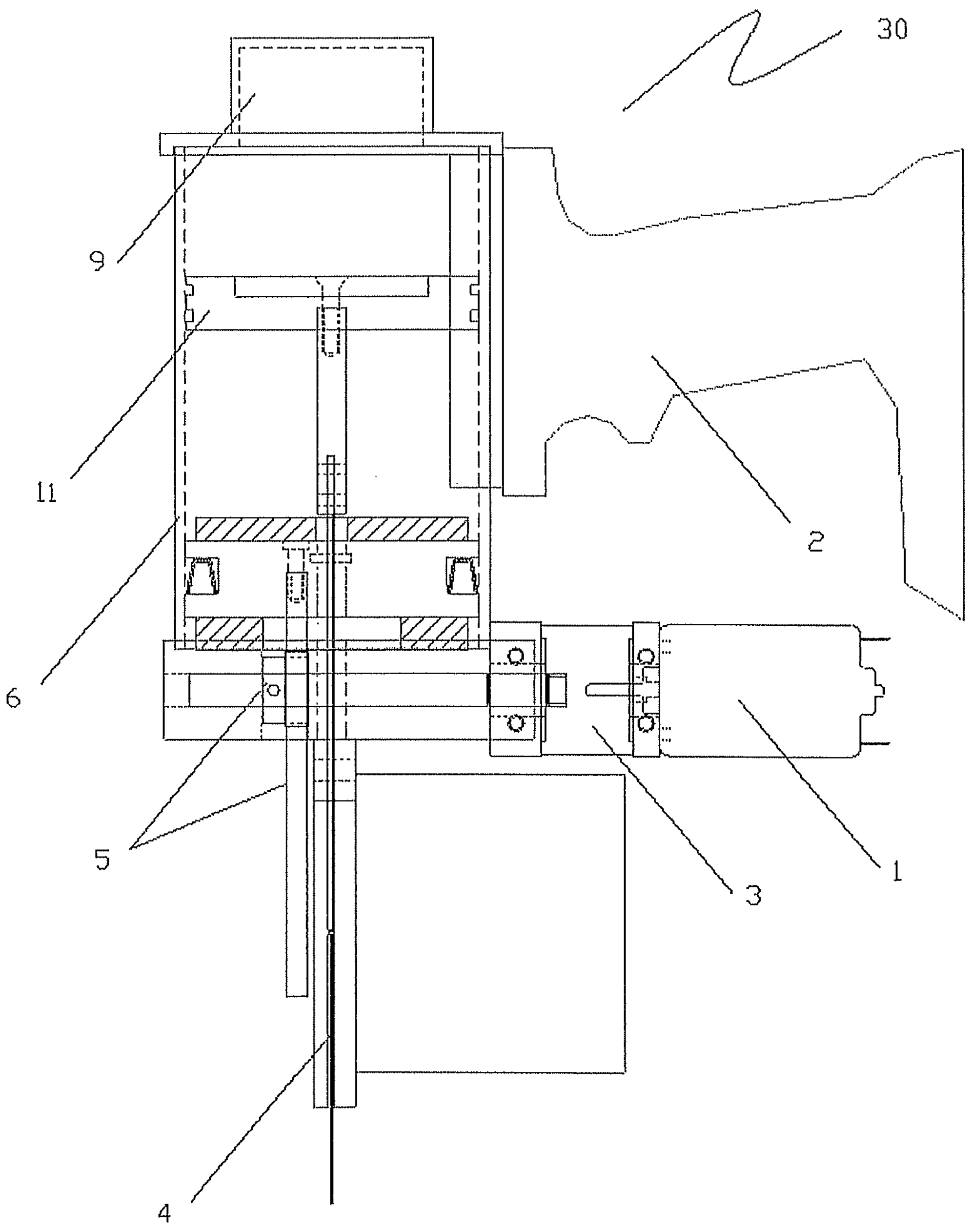
FIG. 3 shows a cutaway view of a fastener driving apparatus showing the drive piston and anvil being released and the fastener being driven into the substrate in accordance with an exemplary embodiment of the present disclosure.
Figure 4:
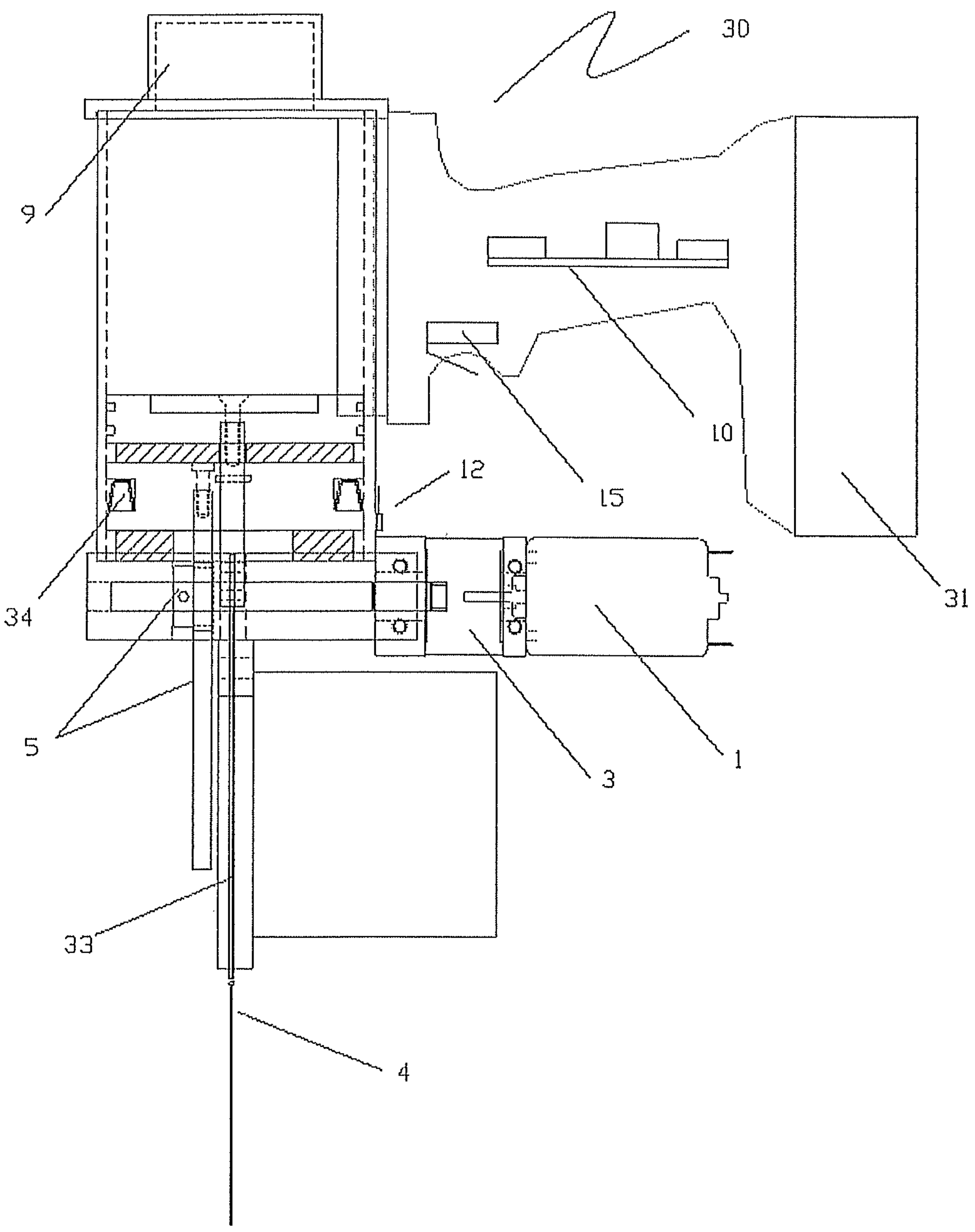
FIG. 4 shows a cutaway view of a fastener driving apparatus, in accordance with an exemplary embodiment of the present disclosure showing the fastener fully driven.
Figure 5:
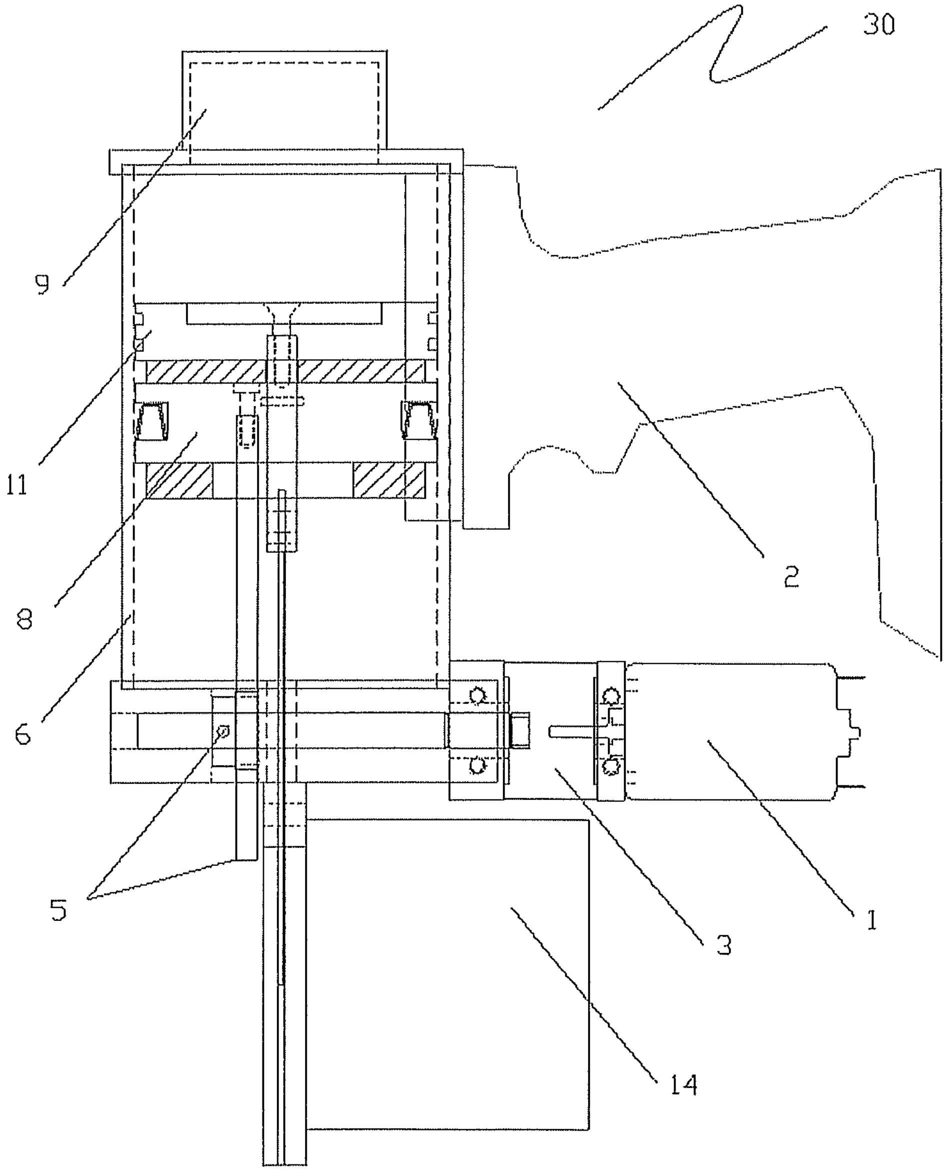
FIG. 5 shows a cutaway view of a fastener driving apparatus, in accordance with an exemplary embodiment of the present disclosure showing the vacuum piston returning to a top dead center position and contacting the drive piston and moving it to the top dead center position as well.
Figure 6:
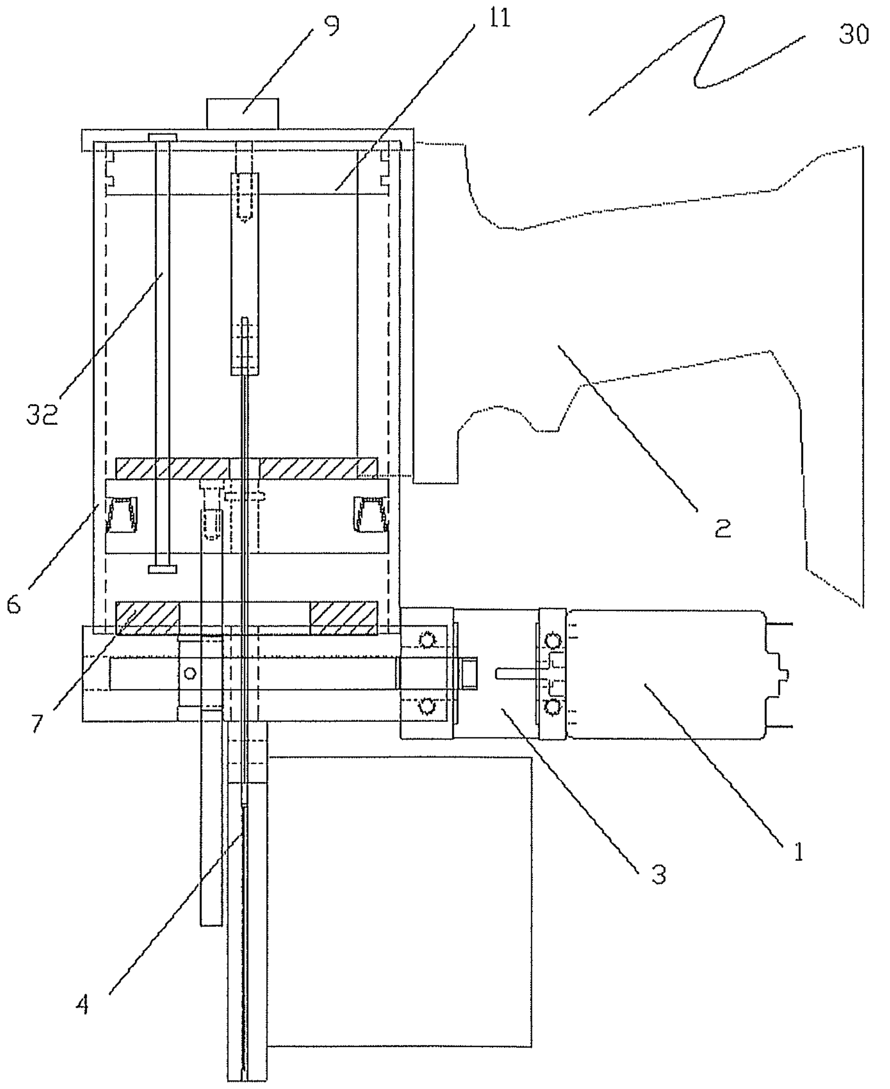
FIG. 6 shows a cutaway view of a fastener driving apparatus, in accordance with an exemplary embodiment of the present disclosure showing a mechanical element to dislodge the drive piston from the retention means.

The best mode for carrying out the present disclosure is presented in terms of its preferred embodiment, herein depicted in the accompanying figures. The preferred embodiments described herein detail for illustrative purposes are subject to many variations. It is understood that various omissions and substitutions of equivalents are contemplated as circumstances may suggest or render expedient, but are intended to cover the application or implementation without departing from the spirit or scope of the present disclosure. Furthermore, although the following relates substantially to one embodiment of the design, it will be understood by those familiar with the art that changes to materials, part descriptions and geometries can be made without departing from the spirit of the invention. It is further understood that references such as front, back or top dead center, bottom dead center do not refer to exact positions but approximate positions as understood in the context of the geometry in the attached figures.

The terms "a" and "an" herein do not denote a limitation of quantity, but rather denote the presence of at least one of the referenced items.

The present disclosure provides for a fastener driving apparatus. In an embodiment, the apparatus comprises a power source, a control circuit, a motor, a vacuum piston, a linear motion converter, a drive piston, an anvil, a retention means, and a cylinder. In an embodiment, the apparatus also comprises a chamber in which a vacuum may be formed or expanded. The power source provides power to the control circuit and to the motor, which motor is responsive to the control circuit. The linear motion converter is coupled to the motor and to the vacuum piston, and uses the motion generated by the motor to actuate the vacuum piston. The vacuum piston and the drive piston are each disposed within the cylinder. The drive piston is held in place by the retention means, and the anvil is coupled to the drive piston. The vacuum piston is capable of generating a vacuum within the cylinder or chamber or creating a vacuum chamber, which vacuum, upon reaching a particular volume, may cause the drive piston to be released from the retention means such that the anvil is capable of driving a fastener into a substrate. As used herein, vacuum refers to achieving an absolute pressure of less than 7 psi during at least one point in in the formation, expansion of creation of the vacuum chamber prior to the release of the drive piston. In another embodiment, the drive piston may be released from the retention means independently from the vacuum that has been generated in the cylinder or chamber (such as by deactivating an electromagnet that is the retention means). The apparatus may additionally comprise at least one sensor for detecting a position of each of the vacuum piston and the drive piston and directing the control circuit to accordingly activate or deactivate the motor or power source based on such positioning.

The apparatus may further comprise a vent means, at least one valve, at least one bumper, and a mechanical element. The vent means vents any air in excess of a certain threshold amount that becomes trapped between the vacuum piston and the drive piston. In an embodiment, the threshold amount comprises anything in excess of three percent of the maximum volume of the vacuum, however, it will be apparent that the threshold amount may be a different amount and is otherwise not limited to the particular value recited herein. The at least one valve may be any of a leak valve, a check valve, and a flow valve, and is preferably disposed on at least one of the vacuum piston and the cylinder. The at least one bumper is disposed between the vacuum piston and the drive piston, absorbs any energy remaining within the drive piston, cylinder or chamber after the anvil drives the fastener, and may prevent damage to the vacuum piston and drive piston that may otherwise result from such components coming into contact with one another. The mechanical element is a device such as a lost motion device, sear or trip lever, which releases the drive piston from the retention means based on the positioning of the vacuum piston.

During a drive cycle, the linear motion converter converts the rotational motion of the motor into linear motion, which linear motion is used to actuate the vacuum piston. Once actuated, the vacuum piston moves from a first position to a second position in order to generate a vacuum within the cylinder in which the vacuum piston is situated. The drive piston, which is retained in the first position by the retention means, remains in the first position until the vacuum generated by the vacuum piston has reached a sufficient volume, at which point the drive piston can be released from the retention means. (It will be apparent that the drive piston may be released from the retention means mechanically (through a trip lever, sear or lost motion device, for example), electrically by deactivating an electromagnet, where the electromagnet is the retention means, or by activating or deactivating a solenoid where a solenoid is part of the retention means. It will be further apparent that the retention means does not have to act directly an the drive piston in order to retain it in as first position. For example, where the drive piston is coupled to an anvil, the drive piston may be retained by retention means acting on the anvil.) The drive piston uses the force of the vacuum to move from the first position to the second position, which accordingly causes the anvil to move from and to the same. As the anvil moves from a first position to a second position, it will come into contact with the head of a fastener and will transfer the force of the vacuum to such fastener in order to drive it into the substrate. In an embodiment, the linear motion converter may thereafter actuate the vacuum piston in order to move the vacuum piston from the second position to the first position, which movement thereof would resultingly cause the drive piston to similarly return to the first position. This would have the effect of returning the various components of the apparatus to their initial positions such that the drive cycle could be operatively repeated.

Referring now to FIGS. 1 through 6, and in an exemplary embodiment, the drive cycle of the fastener driving apparatus 30 is initiated by the user pressing a trigger switch 15 that causes power to be directed from the power source 31 to the motor 1 through the control circuit 10. The user will preferably hold the apparatus 30 by the hand grip 2 in order to avoid safety issues during operation. The control circuit 10 may be any device capable of transmitting power to the motor 1 for the purpose of initiating a drive cycle and then removing the power to the motor 1 after the drive cycle has substantially completed. Directing power to the motor 1 causes it to turn, transferring energy through the rotating elements thereof and into the linear motion converter 5. The linear motion converter 5 is operatively coupled to the motor 1 and to the vacuum piston 8, and may be any mechanism capable of converting the rotational motion of the motor 1 into a linear motion for use with the vacuum piston 8. In an embodiment, the linear motion converter 5 comprises one of a slider crank, rack and pinion, friction drive, belt drive, screw drive, and cable drive, with the preferred embodiment being a rack and pinion. A gear reducer 3 is included, which reduces the speed of the rotational motion outputted by the motor 1 to a speed at which the linear motion converter 5 may operate.

The linear motion converter 5 moves the vacuum piston 8 away from the drive piston 11, thereby resulting in a vacuum being generated within the cylinder 6 or the chamber 13, which chamber 13 may, in an embodiment, be disposed between the vacuum piston 8 and the drive piston 11 within cylinder 6. The motor 1 continues to rotate, which rotation further moves the vacuum piston 8 until it is approximately at a bottom dead center position (hereinafter referred to as "BDC") within the cylinder 6 and the chamber 13 is at or near its maximum size. Once this occurs, the vacuum within the cylinder or within the chamber 13 will be at or near its maximum volume. In an embodiment, the chamber 13 is defined by a face of the vacuum piston 8, a face of the drive piston 11, and the cylinder 6, itself. It will be apparent that other configurations of the chamber 13 are also possible. The chamber 13 has a maximum volume that is proportional to the amount of work to be done. For example, where the fastener to be driven is an 8d gauge fastener, the volume of the chamber 13 ranges from about 30 to 70 $in^3$, and more preferably is 50 $in^3$.

The drive piston 11 is held in place by a retention means 9 until the vacuum has reached a particular volume, or after the retention means 9 ceases applying a retention force on the drive piston 11, or when another force acts on the drive piston 11. In an embodiment, the retention means 9 is at least one of a magnet, electromagnet, solenoid, mechanical means (which may be a detent or lever, for example), pneumatic valve, and friction fit. In an embodiment wherein the retention means 9 is an electromagnet, the drive piston 11 may include a ferrous element that allows the drive piston 11 to be retained by a magnet force, and, for the release, the voltage to the electromagnet may be released and the field collapsed such that a retention force on the ferrous element may be greatly reduced. In an embodiment where the drive piston is coupled to another element such as an anvil, the retention means can act on the anvil for example, in order to retain the drive piston in a position. In an embodiment wherein the retention means 9 is a pneumatic valve, the retention means 9 may consist of a hole through the drive piston 11 and a valve that seals off the air above the drive piston 11, which hole in the drive piston 11 allows the pressure to balance across the drive piston 11. A small magnet may also be used for additional retention of the drive piston 11. When the vacuum piston 8 is at BDC and ready to release, the valve above the drive piston 11 is opened. This allows atmospheric pressure to push the drive piston 11 downward as air rushes into the valve above the drive piston 11.

In an embodiment, the retention means 9 may retain the drive piston 11 in the first position until the vacuum in the cylinder 6 or chamber 13 reaches a particular volume. In a preferred embodiment a mechanical element 32 (capable of causing the retention means 9 to release the drive piston) may be provided, which mechanical element 32 may comprise a lost motion device, for example, and which mechanical element 32 allows the vacuum piston 8 to move towards BDC without interfering with the retention means 9 or the drive piston 11. In this embodiment, the mechanical element 32 will not release until the vacuum piston 8 is approximately at BDC thereby ensuring that the chamber 13 or vacuum is able to achieve a sufficient size or volume.

The drive piston 11 is operatively coupled to an anvil 33, which anvil 33 comes into contact with and drives the fastener 4. As stated above, once the vacuum in the cylinder 6 or chamber 13 has reached a particular volume, the retention means 9 is released, which release applies the force of the vacuum onto the drive piston 11 such that the drive piston 11 and anvil 33 are moved downward towards BDC. This movement results in the anvil 33 coming into contact with the head of the fastener 4 and thus transmitting the force of the vacuum to the fastener 4, thereby causing it to be driven into the substrate. In an embodiment, and once the fastener 4 is driven, a new fastener 4 may be loaded into the apparatus 30 from the attached nail magazine 14.

For instance, the result of such as design is that a standard 8 gauge 2.5" long fastener may be fully driven into a pine substrate where the volume of the chamber 13 is approximately 50 $in^3$ and the vacuum is at a level of approximately 3 psia or less. It was discovered that because of the characteristics of the load, that a more constant force is presented to the drive cycle by using a vacuum rather than the inventor's prior concept of a compressed air application. This unexpectedly increases the efficiency of the fastener driving as measured by energy consumed per fastener driven by more than 50%. Additionally, the maximum torque needed from the motor 1 is resultingly decreased by more than 50%, which allows for the use of lower cost components and a lower gear ratio. Furthermore, the disclosure as taught eliminates and obviates a valve for reducing air flow losses, which further decreases cost.

It should be noted that the drive piston 11 and anvil 33 assembly that drives the fastener 4 into the substrate does not compress any type of anvil return spring during the drive cycle. While it was expected that this would result in an improvement to the apparatus 30, the degree of improvement was unexpected. Heretofore in the prior art, the air spring and mechanical spring designs bias the anvil away from the substrate and rob energy during the drive cycle. The improvement not only resulted front no loss of force during the drive cycle, but also from an increased drive speed, as no return spring or bungee were coupled to the drive piston 11. Furthermore, the absence of a return spring simplified jam recovery in that if the anvil 33 jams during a down stroke of the drive cycle, the return stroke of the vacuum piston 8 retracts the anvil 33 and clears the jam. This automatically resets the timing and readies the device for the next drive cycle.

In a preferred embodiment, the drive cycle is followed by a return cycle, which involves the vacuum piston 8 moving from BDC and beginning its upward stroke. The upward stroke may be initiated by reversing the direction of the motor 1, which, in a preferred embodiment, is accomplished via a rack and pinion linear motion converter 5. However, certain alternate linear motion converter 5 embodiments, such as a slider crank mechanism, do not require the stopping and reversing of the motor 1 as is required by the rack and pinion embodiment. This upward stroke causes the vacuum piston 8 to come into contact with the drive piston 11 and effectively returns the drive piston 11 back to its exemplary starting position at or near a top dead center position (hereinafter referred to as "TDC") where the drive piston 11 can be retained by the retention means 9 and prepare for another drive cycle. In a further embodiment, the drive piston 11 may be returned to TDC by either a bungee element or a spring element.

Once the return cycle has completed, the operation of the apparatus 30 may be halted, and the power source 31 may be operatively disconnected from the control circuit 10 and/or the motor 1 dynamically braked. At this point, the apparatus 30 is ready to repeat the drive cycle. In a preferred embodiment, a sensor 12 is used to determine when the drive piston 11 is at or near TDC to allow for the drive cycle to be repeated. Although the vacuum piston 8 is not similarly required to return to TDC, the vacuum piston 8 may preferably stop movement approximately between BDC and TDC in order to prepare for the next drive cycle. In the embodiment wherein the apparatus 30 comprises a sensor 12, the sensor 12 may be further used to determine when the vacuum piston 8 has reached an adequate position. In an embodiment, the remainder of the movement of the vacuum piston 8 towards TDC may occur at the initiation of the next drive cycle.

As discussed above, a vent means 35 may be disposed between the drive piston 11 and vacuum piston 8, and at least one valve 36 may be disposed on either or both of the cylinder 6 and the vacuum piston 8. The vent means 35 vents any air in excess of a threshold amount that may become trapped between the vacuum piston 8 and drive piston 11. It will be apparent that the at least one valve 36 may be one or more of a check valve, a leak valve, and a flow valve. In an embodiment, the vacuum piston 8 may pass over a set of holes, or leak valves, during its movement towards BDC, which occurrence allows air to slowly bleed into the vacuum. This improves safety by returning the cylinder 6 or chamber 13 to atmospheric pressure in the event of a jam during the drive cycle. In a further embodiment, an electrically controlled vent valve may be provided for allowing air to bleed into the vacuum to accomplish a similar function. Additionally, and in a further embodiment, a check valve may be used, which check valve is preferably disposed in the vacuum piston 8. The check valve may reduce the buildup of air in the cylinder 6 or chamber 13 and allow any air trapped between the vacuum piston 8 and the drive piston 11 to be purged out as the vacuum piston 8 approaches the drive piston 11 at TDC. In still a further embodiment, a seal 34 such as a u-cup seal may be disposed on the vacuum piston 8 to further facilitate the bleeding of air into the vacuum. The seal 34 acts as a one way valve by providing a tight seal in the direction moving from TDC to BDC, thus precluding the passage of air in such direction and otherwise allowing air to pass when moving in the other direction, which passage results in any trapped air being released.

The check valve and seal 34 help to facilitate the creation of the maximum vacuum during the movement of the vacuum piston 8 from TDC to BDC and thus to ensure that a sufficient force is used to drive the fastener 4 into the substrate. And, in another embodiment, a flow valve may be included, which provides for an adjustment of the flow of air to the atmospheric side of the drive piston 11. In this way, the flow valve allows for the regulation of force of the vacuum during the drive cycle. The apparatus 30 may include one or more of any of the above-mentioned valves and seals.

In another embodiment, the apparatus 30 further comprises a bumper 7 disposed between the vacuum piston 8 and the drive piston 11. The bumper 7 absorbs any force from the vacuum remaining after the completion of the drive cycle or the return cycle, thereby preventing that remaining force from being transmitted to another component of the apparatus 30. Namely, the bumper 7 prevents the remaining force from causing the vacuum piston 8 and the drive piston 11 to damagingly contact one another. In an embodiment, more than one bumper 7 may be used as described for added force absorption and protection of the various components.

Figure 7:
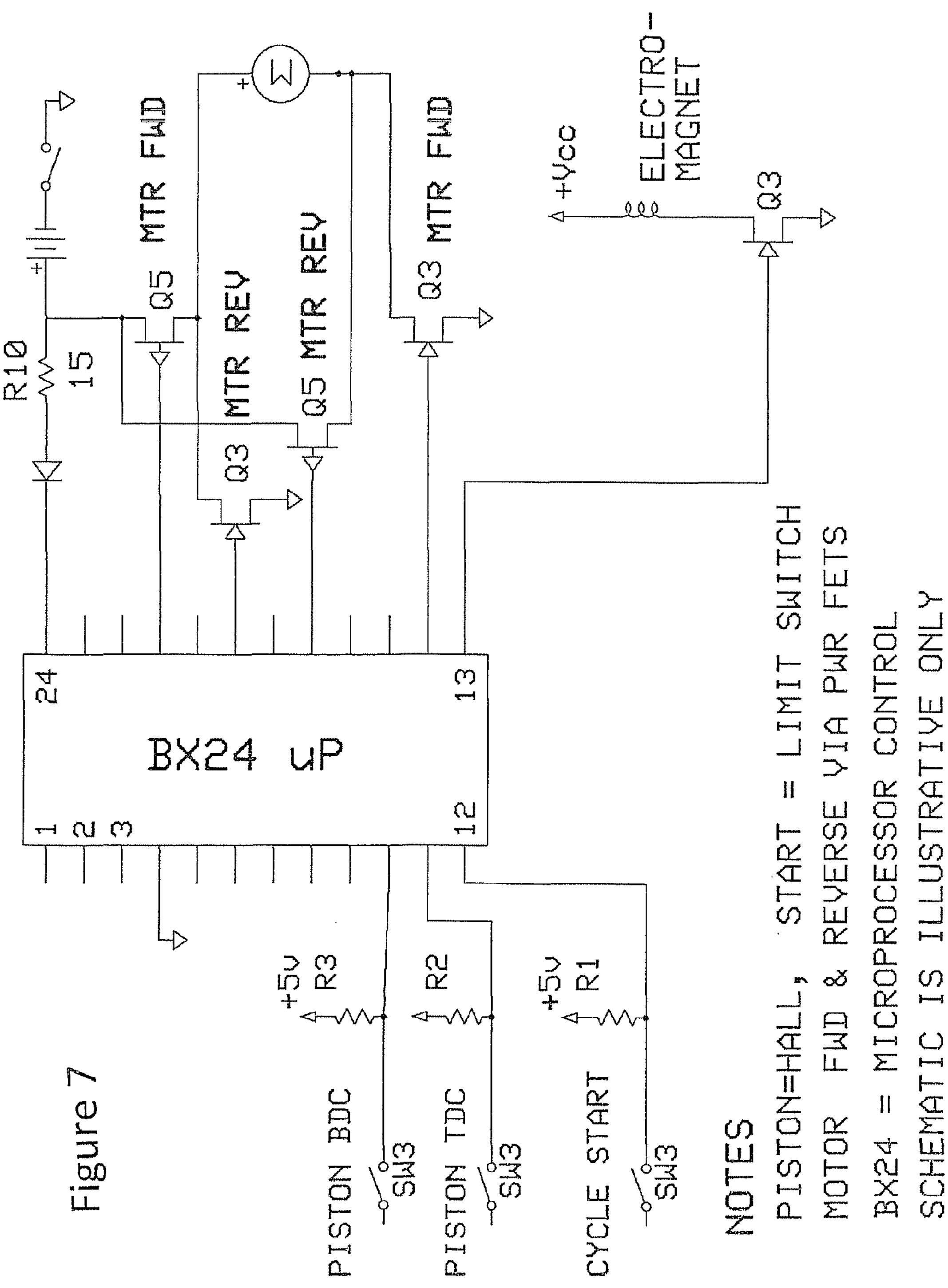
FIG. 7 shows a diagram of an exemplary control circuit of a fastener driving apparatus, in accordance with an exemplary embodiment of the present disclosure.

Referring now to FIG. 7, and in a preferred embodiment, the control circuit 10 comprises high power switching elements and four control circuit inputs. The control circuit inputs control the endpoint positioning of the apparatus 30 for the drive cycle and the return cycle, the point at which the retention means 9 releases the drive piston 11, the pressure applied by the user to the trigger switch 15, and a safety switch to ensure that the apparatus 30 is adequately positioned against the substrate prior to driving a fastener 4. In a further embodiment, and for a lower cost device, at least one of these inputs may be eliminated through the use of cams and linkages. The control circuit 10 may input signals from timers and/or sensors 12, as well as output to an interface or light-emitting diodes. In a preferred embodiment, the apparatus 30 utilizes a trigger switch 15 as well as at least one Hall sensor 12 and a magnet that moves cooperatively with the linear motion converter 5 and vacuum piston 8 assembly.

In a further embodiment, one or more fault conditions may be detectable by the control circuit 10 and/or sensors 12. Where one or more of the control circuit 10 and/or sensors 12 have failed, the apparatus 30 may be safely shut down and operation thereof may be inhibited until the detected fault is corrected. A fault condition is defined as any condition in which the apparatus 30 could operate without all safety conditions being met. The safety conditions may include the contact trip on the foot of the apparatus 30 as well as the trigger switch for cycle initiation.

Although the aforementioned elements are used in the preferred design, it is understood by those familiar with the art that considerable simplification is possible without departing from the spirit of the invention. It is further understood by those skilled in the art that the sensors 12 can be used in conjunction with other elements of the control circuit 10 to allow location at different places, and that sensors 12 can be of many forms including, but not limited to, limit switches, Hall effect sensors, photo sensors, reed switches, timers, and current or voltage sensors, without departing from the spirit of the invention. Further, preferred embodiments of the control circuit 10 include, but are not limited to, low battery indication, pulse-width modulation control of motor, status display, and sequential or bump fire.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the disclosure and various embodiments with various modifications as are suited to the particular use contemplated.

What is claimed is:

1. A fastener driving apparatus for driving a fastener into a substrate, the apparatus comprising:

a power source;

a control circuit, said control circuit operatively coupled to said power source;

a motor, said motor operatively coupled to said power source, said motor responsive to said control circuit;

a vacuum piston;

a linear motion converter, said linear motion converter operatively coupled to said motor, said linear motion converter operatively coupled to said vacuum piston;

a drive piston;

an anvil, said anvil operatively coupled to said drive piston;

a retention means, said retention means retaining said drive piston in a first position until a sufficient force is applied on the drive piston or until a retention force of said retention means is released; and a cylinder, said vacuum piston capable of reciprocally moving within said cylinder, said drive piston capable of reciprocally moving within said cylinder, wherein during a drive cycle said linear motion converter actuates said vacuum piston such that a vacuum is generated, which vacuum is applied on said drive piston, and when said vacuum reaches a sufficient volume, said retention means releases said drive piston and wherein said drive piston moves from a first position to a second position such that said anvil is capable of driving a fastener into a substrate.

2. The apparatus as claimed in claim 1, wherein during a return cycle said drive piston is moved from the second position to the first position such that the apparatus is thereafter capable of repeating the drive cycle.

3. The apparatus as claimed in claim 1, wherein said retention means comprises at least one of a magnet, electromagnet, solenoid, mechanical means, pneumatic valve, and friction fit.

4. The apparatus as claimed in claim 1, wherein said apparatus further comprises a vent means, said vent means capable of venting any air in excess of a threshold amount trapped between said vacuum piston and said drive piston.

5. The apparatus as claimed in claim 1, wherein said apparatus further comprises at least one valve operatively connected to at least one of said cylinder and said vacuum piston.

6. The apparatus as claimed in claim 1, wherein said apparatus further comprises at least one bumper, said at least one bumper disposed between said vacuum piston and said drive piston, said at least one bumper absorbing at least a portion of the energy remaining within said drive piston after at least one of the drive cycle and the return cycle is completed.

7. The apparatus as claimed in claim 1, wherein said control circuit precludes the further operation of the apparatus upon the detection of a fault condition until the fault condition has been resolved.

8. The apparatus as claimed in claim 1, wherein said apparatus further comprises a mechanical element, which mechanical element is capable of releasing said drive piston from said retention means based on a position of said vacuum piston in said cylinder.

9. A fastener driving apparatus for driving a fastener into a substrate, the apparatus comprising:

- a power source;
- a control circuit, said control circuit operatively coupled to said power source;
- a motor, said motor operatively coupled to said power source, said motor responsive to said control circuit;
- a vacuum piston;
- a linear motion converter, said linear motion converter operatively coupled to said motor, said linear motion converter operatively coupled to said vacuum piston;
- a drive piston;
- an anvil, said anvil operatively coupled to said drive piston;
- at least one sensor;
- a retention means, said retention means retaining said drive piston in a first position until a sufficient farce is applied on the drive piston or until a retention force of said retention means is released; and
- a cylinder, said vacuum piston capable of reciprocally moving within said cylinder, said drive piston capable of reciprocally moving within said cylinder,
- wherein during a drive cycle said linear motion converter actuates said vacuum piston such that a vacuum is generated, which vacuum is applied on said drive piston, and when said vacuum reaches a sufficient volume, said retention means releases said drive piston and wherein said drive piston moves from a first position to a second position such that said anvil is capable of driving a fastener into a substrate, and
- wherein said at least one sensor is capable of determining a position of at least one of said vacuum piston and said drive piston and said at least one sensor is further capable of at least (i) directing said control circuit to stop operation of the apparatus based on at least one position of at least one of said vacuum piston and said drive piston or (ii) causing the retention means to release the drive piston.

10. The apparatus as claimed in claim 9, wherein during a return cycle said drive piston is moved from the second position to the first position such that the apparatus is thereafter capable of repeating the drive cycle.

11. The apparatus as claimed in claim 9, wherein said retention means comprises at least one of a magnet, electromagnet, solenoid, mechanical means, pneumatic valve, and friction fit.

12. The apparatus as claimed in claim 9, wherein said apparatus further comprises a vent means, said vent means capable of venting any air in excess of a threshold amount trapped between said vacuum piston and said drive piston.

13. The apparatus as claimed in claim 9, wherein said apparatus further comprises at least one valve operatively connected to at least one of said cylinder and said vacuum piston.

14. The apparatus as claimed in claim 9, wherein said apparatus further comprises at least one bumper, said at least one bumper disposed between said vacuum piston and said drive piston, said at least one bumper absorbing at least a portion of the energy remaining in the drive piston after at least one of the drive cycle and the return cycle is completed.

15. The apparatus as claimed in claim 9, wherein said at least one sensor is capable of detecting the existence of a fault condition, said control circuit precluding the further operation of the apparatus upon the detection of a fault condition until the fault condition has been resolved.

16. The apparatus as claimed in claim 9, wherein said apparatus further comprises a mechanical element, which mechanical element is capable of releasing said drive piston from said retention means based on a position of said vacuum piston in said cylinder.

17. A fastener driving apparatus for driving a fastener into a substrate, the apparatus comprising:

- a power source;
- a control circuit, said control circuit operatively coupled to said power source;
- a motor, said motor operatively coupled to said power source, said motor responsive to said control circuit;
- a vacuum piston;
- a linear motion converter, said linear motion converter operatively coupled to said motor, said linear motion converter operatively coupled to said vacuum piston;
- a drive piston;
- an anvil, said anvil operatively coupled to said chive piston;
- a chamber, said chamber being formed or expanded and capable of receiving a vacuum therein;
- a retention means, said retention means retaining said drive piston in a first position until a sufficient force is applied on the drive piston or until a retention force of said retention means is released; and
- a cylinder, said vacuum piston capable of reciprocally moving within said cylinder, said drive piston capable of reciprocally moving within said cylinder,
- wherein during a drive cycle said linear motion converter actuates said vacuum piston such that a vacuum is generated in the chamber, which vacuum is applied on said drive piston, and when said vacuum reaches a sufficient volume, said retention means releases said drive piston and wherein said drive piston moves from a first position to a second position such that said anvil is capable of driving a fastener into a substrate and wherein during a return cycle said drive piston is moved from the second position to the first position such that the apparatus is thereafter capable of repeating the drive cycle.

18. The apparatus as claimed in claim 17, wherein said control circuit precludes the further operation of the apparatus upon the detection of a fault condition until the fault condition has been resolved.

19. The apparatus as claimed in claim 17, wherein said retention means comprises at least one of a magnet, electro-magnet, solenoid, mechanical means, pneumatic valve, and friction fit.

20. The apparatus as claimed in claim 17, wherein said apparatus further comprises a mechanical element, which mechanical element is capable of releasing said drive piston from said retention means based on a position of said vacuum piston in said cylinder.

* * * * *